UNITED STATES PATENT OFFICE.

GEORGE D. HART AND CHARLES L. HART, OF CHICAGO, ILLINOIS, ASSIGNORS OF FIFTY-ONE ONE-HUNDREDTHS TO EGBERT W. GILLETT AND EDGAR A. HILL, OF SAME PLACE.

LEAVEN.

SPECIFICATION forming part of Letters Patent No. 538,195, dated April 23, 1895.

Application filed January 14, 1895. Serial No. 534,874. (No specimens.)

*To all whom it may concern:*

Be it known that we, GEORGE D. HART and CHARLES L. HART, of Chicago, Cook county, Illinois, have invented certain new and useful Improvements in the Manufacture of Ferment Leavens, of which the following is a full, clear, and exact description, sufficient to enable others skilled in the art to make and use the same.

In the making of Japanese saké, the native brewers first prepare quantities of a material known as "koji" obtained by growing the spores of rice-smut (*Aspergillus oryzeæ*) or "moyashi" as it is termed, on steamed broken rice grains. About 0.000025 by volume of the moyashi spores are admixed with the cooling rice at *e. g.*, 37° centigrade. The batch is spread in thin layers, *e. g.*, one inch, on hand trays and is allowed to grow for thirty-six to sixty hours in the niches of an underground vault held at humid even temperature, *e. g.*, 20° centigrade. The spores quickly sprout and extend over the nutrient base eventually as a luxuriant white mold the full thick mycelium of which displays numerous conidia (spore sacks) and interlaces with the rice particles so that the mass can be lifted as a matted cake. The growing mold consumes the nutrient starch in notable measure and generates a marked internal heat, especially in the later stages (*e. g.*, after twenty-four hours) which compels the batches to be closely watched and occasionally broken up to cool (*e. g.*, below 30° centigrade) since an excessive heat tends to endanger the vitality of the plant. Koji produced by the Japanese practice possesses diastatic power much superior to barley malt, and, whether "green" from the trays or after drying in cool air is used (*a*) as a substitute for moyashi in impregnating new batches of steamed rice to grow additional koji or else (*b*) as a converter for fresh supplies of steamed rice in the main process of saké making. Should the growth of the koji be allowed to persist for ninety-six to one hundred and twenty hours the product becomes tané-koji. In this the mold has practically exhausted the nutrient base. Its mycelium becomes shrunken and of dark yellow color while the conidia are greatly multiplied and, on drying in cool air, separate from the residuum, by gentle shaking, as a fresh crop of moyashi spores.

The present invention designs (first) to employ koji fermented as an essential ingredient of finished leavens. Another purpose in view is (second) to improve the manufacture of leavens by providing (*a*) a modified starch body as a vehicle for the leaven proper, and according to preferred practice with such carrier (*b*) to avoid the use of raw corn-meal or other familiar drier, the presence of which becomes optional only and by choice is wholly discarded.

(A) *Starch base.*—In regular factory practice, to obtain a yield of koji preparatory to its use in fermented state according to the invention, it is customary to dispense with rice for the nutrient base and for economy to substitute some cheaper material such as maize. Indian corn or maize reduced to fine grits (*i. e.*, about pin-head size) is ordinarily an acceptable material. The crushed maize may be steeped with advantage for about two to four hours in cold water (slightly sweetened with cane sugar or glucose if desired) and after draining is then put into a cooker having a perforated diaphragm upon which the charge rests. Free steam is admitted and penetrates through the mass, the treatment being continued until the granules are thoroughly softened and sterilized. This may require thirty to sixty minutes dependent upon the heat of the steam. The drier the steam the more rapid is the disruption of the starch cells so that finally (on testing) the granules crush to a jelly like consistency under the fingers but still retain their form as a damp nodular mass. At the finish the cooked grits are not so moist (especially if the steam be dry hot) as when the steaming began but yet are in excellent state for use in later stages without necessary addition of water, the presence of which is generally quite superfluous. In the granular form of the material the steam gains ready access to the batch and evenly reduces it avoiding the formation of dry balls or lumps. The nodular porous mass derived by steaming affords easy access for the air and promotes the rapid growth and spread thereon of the plant-life as hereinafter detailed.

The maize can be replaced, wholly or in part, by other cereals, or in general by starchy materials such as potatoes, peas, beans, &c., if thoroughly steamed and reduced to granular state. The grits selected may be fine or coarse while the use of flour, meal, oil-cake or bran is not necessarily precluded, should the same be properly steamed and the material be brought into a porous condition suitable for the spread of the plant growth.

(B) *Koji growing.*—As a leaven ingredient koji can be employed according to the invention at various stages of its growth. By Japanese practice the time necessary for a koji crop was at least thirty-six hours. If the batch were treated in a cold water bath after growing for some twenty-four hours, the total period for the crop then became sixty hours. Under either plan the chief object would seem to be to procure a koji of maximum diastatic power. Such protracted growing is not an essential of the present improvement although koji thus obtained can be advantageously used therein. For clearness merely, but not in way of limitation since no precise number of hours need be fixed, different koji crops can be distinguished as follows:

|  Name. | Hours grown. |
|---|---|
| (A) Early koji | 10 to 14 |
| (B) Medium koji | 18 to 24 |
| (C) Late koji | 36 to 48 |

As already stated, koji C is strong in diastase while the nutrient base has been notably consumed, the loss being about forty per cent. By abridging the period of growth as the invention contemplates, the consumption of the nutrient base becomes much less marked beside which the diastase is reduced although still present in quantity sufficient for starch conversion in leaven making. It thus becomes feasible to produce a leaven by properly fermenting and curing koji A or koji B without the need of adding extra supplies of starch materials as a vehicle or drier such as the use of koji C with its high diastase and low starch content will ordinarily require. In brief, the younger koji crops, beside the true mold growth or koji proper, contain also a marked quantity of the nutrient starch which yet remains unconsumed. This material constitutes a separate starch supply and is available as such although in using the older growths or crops the main supply of starch stuff generally appears as a distinct or extra addition.

Manifestly, heat and moisture within proper limits are the prime essentials for a koji yield; yet it is noteworthy that minor differences in quantity of moyashi spores taken at the outset; in the moist state and initial heat of the batch and in the thickness of the layer may easily vary the speed and luxuriance of growth.

If a warm humid atmosphere prevails, as in a hot-house, a koji of definite type will be obtained, e. g., in thirty-six hours. Under less favorable conditions the time necessary thereto would be longer. Reductions in room temperature or in humidity moderate the intensity of growth but may often suffice to "chill" the plant or otherwise to impair its quality, especially so, if the mold is well set and begins to thoroughly mat the starch, e. g., after twenty-four hours. A koji crop then enters upon a critical stage or rather becomes more sensitive to minor variations in the state of the atmosphere or of the batch and tends, unless skillfully watched, to develop an abnormal "black-growth." During the critical stage, as indeed earlier, the elaboration of diastase obviously proceeds at the expense of the nutrient starch upon which the mold thrives. A thirty-six-hour koji is ordinarily so rich in diastase that if soaked in water excess the starch base yet remaining quickly converts into sugar solution. When such a koji is employed we find it advisable, therefore, to restore the loss of the base by supplemental additions of starchy materials. On the other hand, by restricting the period of koji growth as we design so that a crop is obtained in e. g., ten to twenty-four hours we avoid the risks of the critical stage with its added cares; diminish the diastase although enough of it is obtained for leaven use; reduce the consumption of starch base which is, however, transformed by the plant life and rendered highly available as a vehicle for the ferment and avoid in large measure the necessary addition of further starch supplies.

In growing a koji crop, the nutrient base can be impregnated with moyashi or else with koji portions of various age. When of like age, a distinction ensues between "green" and dry material, since in the act of drying the crop also slowly matures. In the table below, the smaller number of pounds calls for "dry" the higher number for "green" koji. The numbers are illustrative only and are not intended in limitation. An excess is merely wasteful and may demand more care by reason of intensive growth. The starch base to be used is reckoned throughout as at one thousand pounds "dry," i. e., before steaming.

*For Growing.*

| Take of: | Koji A. | Koji B. | Koji C. | Tané-koji. |
|---|---|---|---|---|
| Koji A ............pounds.. | 100–125 | | | |
| Koji B ............ do | 75–115 | 65–100 | | |
| Koji C ............ do .. | 50–100 | 35– 80 | 25–60 | |
| Tané-koji.. ............ do .. | 12– 20 | 8– 12 | 5– 8 | 5– 8 |
| Moyashi............ grams.. | 180–240 | 60– 80 | 45–60 | 45–60 |

In general, under favorable conditions of heat and moisture a batch of steamed starch base impregnated with moyashi spores, especially if "bedded up" after the manner of malt growing, is apt to undergo a distinctive change in six to eight hours. Such change is marked not simply by a slight rise in temperature but by the fact that the odor of the cooked meal has quite disappeared and in its stead a peculiar aromatic odor, as of fruit blossoms becomes manifest. The material is sweet to the taste. The indications are that the plant life is thoroughly set and active and "incipient" koji exists.

Koji A: Steamed starch base, one thousand pounds; moyashi, one hundred and eighty to two hundred and forty grams.

The moyashi or the equivalent thereof from a prior koji crop is admixed with the nutrient base at, e. g., 35° centigrade. The growing-room should be 26° to 28° centigrade, and the air sufficiently humid (as in a hot-house) to prevent the batch from drying. It is usual to incorporate the spores with a detached portion of the starch base and then to thoroughly admix this with the main body. The batch is "bedded up" as on a malt-floor, at a depth of one to two feet to retain heat and promote growth. When the bed at its center shows an internal heat, e. g., 40° centigrade, the mass should be broken down or turned to cool. It is then re-bedded at shallower depth if necessary to prevent overheating. In one to two hours later the temperature at center may rise to 44° centigrade. The batch is turned again and spread thinner so as to cover, e. g., twice the original floor space. Compared with Japanese practice, the plan here stated with its high range of temperatures tends to "force" a growth; and the excess of spores taken has the like tendency. After ten to fourteen hours, the filaments of mycelium appear and begin to interlace and to display the conidia. Enough diastase is now present to effect requisite conversion of the batch or at least to produce sugar sufficient for the subsequent fermentation. The starch material is yet in abundant supply, not only for attack by the diastase but also to afford "body" to the finished leaven which thus requires no further starch addition.

If the crop be grown on trays, instead of in "bed," the layer is spread at depth, e. g., 1.5 to 2.5 inches. The air is humid as usual but its temperature somewhat higher, e. g., 30° to 35° centigrade. The same precautions by turning the mass at intervals, to prevent an internal heat much exceeding 44° centigrade, are observed.

Koji B: Steamed starch base, one thousand pounds; moyashi, sixty to eighty grams.

The steamed base on cooling to 30° centigrade, is impregnated with the moyashi and the batch is spread to a depth of 1.5 to two inches. The humid atmosphere of the room is held at, e. g., 30° centigrade, while that of the batch, as growing proceeds, may range from 40° to 45° centigrade, but should not, for safety, exceed the higher limit. Occasional stirring serves to cool the mass, if necessary or else, the moisture in the room, or its temperature may be diminished. In twenty to twenty-four hours the material is matted so as to hang together and can be "checked" from further development by removal to a cool, dry place. Should the batch be set at, e. g., three inches, on the trays, the thicker layer better retains the internal heat and the growth may be ended, e. g., in eighteen hours. In lieu of the moyashi, detached portions of prior koji crops can be used. An excessive quantity of "crop" addition is unobjectionable, and when applied "green" it begins at once to spread and develop, thus abridging the time. The period of growth being more extended than for koji A it is usually under conditions of heat and humidity less apt to "force" the spread of the mold. The plant becomes more luxurious, however; the mycelial threads and conidia more abundant; the batch is well matted and evolution of diastase more marked. Koji at this period approaches a critical state in which minor changes of heat and moisture, especially a "chilling" of the plant-life in presence of plentiful moisture may affect its vigor; a risk that in the earlier stage it is well-nigh free from.

Koji C: Steamed starch base, one thousand pounds; moyashi, forty-five to sixty grams.

The steamed material on cooling to 27° to 37° centigrade, is admixed with the moyashi and the batch spread out in thin layers, e. g., one inch, on malt-floor or trays and held in humid atmosphere of about 20° centigrade, from thirty-six to forty-eight hours. The internal heat of the batch ranges from 27° to 35° centigrade. If carefully watched and turned the layer of material under treatment may be three or four inches in thickness and its temperature may rise as high as 45° centigrade, to promote the quantity and speed of output. It is because of such considerations as these that only approximate limits can be stated. During the period of growth the spores develop and extend over and throughout the starch base, as a rich interlaced mold or fungus growth ultimately of yellow-white tinge. When the thickly set fungus assumes the tinge noted, its growth can be arrested by simply withdrawing the moisture from the atmosphere. Thereupon the material is allowed to dry in a cool place (when stored for future use) or can be applied while yet moist in the main process.

By allowing the growth to continue for about ninety-six to one hundred and twenty hours, instead of arresting it at the earlier stage, i. e., thirty-six to forty-eight hours, the mycelial plant characteristic of tané-koji gradually assumes a dark yellowish-green color. On drying thereupon, the new moyashi spores become detached by sifting as a powder and after several repetitions of the growing, they afford a "pure culture" crop of uniform value.

(C) *Leaven compounds.*—Finished leavens made in accordance with the invention require the presence of fermented koji as a distinct ingredient. To ferment the koji it is simply necessary that water be applied thereto at proper temperature and in volume sufficient to transform its state, that is, to check the further growth of the koji in air as a mold, and to induce fermentation therein in presence of the water excess.

If the koji be rich in diastase, e. g., koji C, a suitable starch body serving as a vehicle for the fermented koji should generally be incorporated as a separate element or addition.

When the koji crops of younger growth are selected the starch supply is already present as a part of the unconsumed base so that no extra or supplemental addition need ordinarily be made unless as a final drier.

A distinct advantage of the present improvement lies in the fact that the leaven materials are ordinarily worked while comparatively dry. Except for koji fermentation a surplus of water is unnecessary and even for such purpose the volume of water is generally at a minimum and simply sufficient to effect ferment action. If the finished leaven be transferred at once to a brewer's wort or distillery mash it can be thinned enough for easy flow and distribution. When a starch carrier is present, as a separate addition, it is by preference steamed or if drenched in scalding water then immediately drained. Proceeding thus, the familiar practice of "dosing" a yeast batch with large volumes of corn-meal or other raw drier, to absorb excess of water becomes superfluous. The absence of the raw drier, eliminates the weevil-eggs and maggots which otherwise are apt to infest the finished yeast cake of commerce causing immense losses especially in warm, moist climates.

(Formula 1:) Koji A, one thousand pounds; water, 40° to 44° centigrade, two hundred and fifty quarts; yeast "starter," five to fifteen pounds.

The koji A whether "green" or dry is dosed with enough water to produce a thick mush which may barely flow if at all. More water is needed for the dry material than for the "green." If ordinary yeast cakes be taken for a "starter" some fifteen pounds can be used. The less quantity, i. e., five pounds, will suffice should compressed yeast or dry scrap of the improved leaven, such as exists about the factory, be selected instead. The yeast "starter" may be separately soaked for fifteen to sixty minutes in, e. g., one quart of water per one pound thereof and then be admixed with the koji mush. The diastase though present in minor amount effects conversion of a portion of the starch at the favorable temperature; and fermentation ensues and tends to keep the batch at proper heat, especially if the room be, e. g., 20° to 25° centigrade. Occasional stirring hastens the ferment action and after some three to six hours a distinct alcoholic odor becomes manifest whereupon the mass is in readiness to be promptly rolled and cut into cakes or forced through sieves to form crumbs. If the batch be too soft to roll, a quantity of raw drier or preferably of steamed starch base, or of "incipient" koji or some of the regular koji growths, can be added in quantity sufficient to make a tenacious dough and the mass be left to stand for an hour or so, before caking. The cakes or crumbs are received upon trays and set in the drying-room at 20° to 30° centigrade. After four to eight days the leaven cakes or crumbs are cured, fermentation being checked as the drying proceeds. The use of the yeast "starter" is not essential. Should it be discarded, the conditions otherwise remaining the same, the desired alcoholic flavor will become manifest in the dough or mush after lapse of, e. g., fourteen to twenty hours.

In lieu of koji A a like quantity of koji B can be used, according to the method and formula stated. Being richer in diastase koji B will convert quicker and the time for fermentation be somewhat diminished. By careful practice, the requisite volume of water to effect the ferment action can be nicely fixed for either of the koji growths specified so that the leaven obtained will be in dough form ready for the trays without need of supplying an extra "drier" of any sort to absorb water excess.

The use of koji C in manner here proposed is also admissible but because of its diastatic power and the time necessary in the growth of the material, economy and best results are generally attained by incorporating with koji C a separate starch carrier addition. It is also feasible, to admix the koji crops of various age in changing proportion, and to ferment the mixture as by the practice stated.

The final absorbent or drier, if such be called for to reduce the "green" leaven to a tenacious dough, can obviously consist of any one or more of the koji crops, incipient koji, or steamed or raw starch stuff, as preferred.

(Formula 2:) Starch base, steamed, one thousand pounds; koji C, two hundred pounds; yeast cake, five to fifteen pounds.

To one thousand pounds, of maize grits conveniently steamed as already described (A. starch base) and allowed to cool in its moist state, to e. g., 40° to 44° centigrade, add two hundred pounds, of koji C and five to fifteen pounds, of dry scrap yeast or compressed yeast, or of ordinary yeast cake, as the case may be. Usually before admixture in batch the koji and yeast scrap are separately soaked in tepid water one and one-half quart per pound, of the material being taken. The yeast is soaked for fifteen to sixty minutes and the koji for fifteen minutes. Then the two are united and the soaking continued for, e. g., three hours at 25° to 40° centigrade, during which interval active fermentation advances (the water being in excess) and is promoted by the yeast-scrap as a starter.

When a decided alcoholic flavor is manifest in the soaking koji and scrap (which may be less than three hours if temperature favors) they are incorporated with the starch carrier and the batch left for four to six hours at 25° to 40° centigrade. During this period fermentation ensues with marked vigor until finally the presence of the alcohol becomes pronounced. Thereupon the dough is made into cakes or crumbs. If the koji and scrap be left to soak over night (say twelve hours) they can be admixed with the starch carrier early in the morning. By reason of this protracted soaking of the ferment stock beforehand, the batch after admixture may be at once made into cakes or crumbs without delay.

In curing leaven cakes under any of the various methods, the moist cakes are laid upon trays in a drying-room at 20° to 30° centigrade, and after four to eight days are cured. While the drying goes on the growth of the ferment cells persists but in subdued fashion which gradually lessens as the water disappears. If the batch is highly alcoholic the "crumbs" are spread at shallower depth on the trays (say at three-fourths to one inch) than if this condition was less manifest. Should the batch be crumbed or caked at once, immediately after the ferment stock is added to the starch carrier (instead of holding the mixture "in batch" for three to four hours as above proposed) the layer of crumbs can then be spread at depth of one to one and one-half inches to better retain the moisture. The yeast cake "starter" may be wholly discarded and the koji alone be united with its starch carrier. Whether "green" or dry, the koji is supplied with a water addition, say one and one-third quarts per pound, of koji and is either admixed at once with the starch carrier or else as preferred, is left by itself to soak and ferment for twenty-four to forty-eight hours at 20° to 30° centigrade. If admixed directly, without preliminary soaking, the resultant dough is held "in batch" for twenty-four to forty-eight hours at 80° to 110° Fahrenheit, in a covered vat. During this period the alcoholic flavor gradually develops and finally decides the operator to check the fermentation in familiar fashion.

The isolated soaking of the koji here proposed, enables the dough to be promptly caked in one to six hours instead of being held "in batch" for the longer time, which becomes essential only when the preliminary fermentation of the koji separately, has not occurred. When the koji has been separately soaked it is feasible to draw off the water extract and use it alone, thus excluding the insoluble residuum; but such practice is of no especial advantage and is, besides wasteful in so far as the residuum itself affords "body" to the compound which may need to be supplied otherwise by an additional quantity of the starch carrier or drier to render the finished dough of proper consistency.

Instead of caking or crumbing the leaven dough, made according to the invention, it can be delivered in bulk to the consumer. The leaven matures as certainly "in batch" as if subdivided and put upon trays to cure. Its ferment quality simply develops more quickly when "in batch" which requires closer attention to hold the leaven at an even stage or maximum and prevent it from "working out." The dough may be put in cold storage if necessary which is quite superfluous when the product cures in the state of crumbs or cakes.

The volume of water for soaking the koji (and scrap when used) is always enough to induce fermentation therein and to protract this action while the leaven batch is curing on the trays; but it need never be in excess so far as to interfere with the production of a consistent dough ready at once to handle for crumbing or caking when the proper stage has arrived. If the water is then found to be too great in quantity the addition of raw cornmeal or other drier has been usually resorted to, and indeed becomes necessary where the familiar practice of drenching the starch stuff with great volume of water at the outset prevails. If the leaven be directly applied in its finished state after the manner of the ordinary yeast batch, to ferment a mash or wort, as in usual brewery or distilling practice, an excess of water employed in the manufacture of the leaven is of no detriment and may be in quantity sufficient to allow the finished batch to flow or be forced through pipes to the ferment tub or vat.

The use of the dry-steamed starch carrier is a distinct advance since the steam thoroughly disrupts the starch cells, keeps the mass comparatively dry, reduces the volume to be handled, enables the fermentation to proceed quickly and thoroughly and yet avoids any superfluous amount of water such as would compel the further addition of a drier, by the older methods, to obtain a tenacious dough.

Instead of steaming, the starch carrier can be drenched with scalding water. The grits should be held in a vat having a perforated bottom, and after flooding with the hot water for, e. g., fifteen minutes the excess of water is drawn off and the mass allowed to drain for, e. g., one hour; but the scalding operation leaves the batch less dry than when steaming is practiced, on which account, if the scalded grits be taken, the amount of water employed for soaking the koji or yeast-cake, is diminished say one-half. Indeed a similar diminution may be observed with advantage even though the steamed grits be taken, if it appears eventually that the leaven dough is too moist and requires the use of a drier. Practice will enable the best proportions to be ascertained.

Meal or flour boiled in water to a mush-like consistency may serve perhaps but might require the presence of a "drier" addition. Raw corn-meal or flour whether used as the starch carrier or as the final drier is most apt to contain the eggs of weevils which develop later and infest the finished product. Materials of this sort, and as well an excessive quantity of water can be employed in conjunction with the fermenting koji to make the finished leaven; but the dry-steamed starch carrier possesses the advantages specified and gets rid of the risk of weevil. Its adoption constitutes of itself a notable improvement over the practice heretofore in vogue.

*Koji equivalents.*—Aside from koji proper obtained by growing moyashi on a steamed starch base, mold-growths of koji-like character (and which for the purposes of the invention are its equivalents and are included by that term) can be readily derived by the use of other spores or smuts taken in like quantity, and grown under the same conditions of heat and humidity upon the steamed base. Experience has shown that moyashi thus finds a full substitute in the use of parasitic smuts such as are native to maize (*Ustilago maydis,*) to wheat, (*Ustilago tritici,*) to rye, (*Claviceps purpurea,*) to barley, (*Ustilago hordei,*) and to oats, (*Ustilago avenæ;*) also, by selecting the spores of edible mush-rooms (*Agaricus campestris* and *Mareamus oreades*) and of the common puff-ball of the pasture fields (*Bovista ammophila.*)

Doubtless many cryptogamic plants such as thrive upon starch food may be shown to respond readily to the requisite conditions and to yield a koji-like material fitted for the making of the improved leaven. Indeed, ordinary brewer's yeast (*Saccharomyces cervisiæ*) if sown upon the starch-base in manner similar to moyashi will eventually develop a mold growth thereon, under like conditions, capable of use in keeping with the invention; and the same is true should the steamed starch-base alone be exposed at proper temperature in humid air to chance infection by air-sown spores; although in such event, the results are not so rapid nor so definite because of the differences in local atmospheres.

In the case of brewer's yeast for example, instead of employing a detached portion of a prior koji growth for the purpose, it is simply necessary to impregnate the fresh supply of steamed base (one thousand pounds) with ordinary yeast-cake or compressed yeast (*Saccharomyces cervisiæ*). The yeast (twenty to eighty pounds) is softened in a minimum of water and admixed with the steamed base which is then distributed on trays or floors and grown under usual conditions already detailed. "Leaven" cakes such as are obtained by practice of the present invention can replace the brewer's yeast but need to be in much less amount—*e. g.*, twenty pounds, will suffice. After thirty-six to sixty hours, dependent upon the yeast or leaven selected and usual variations in course of treatment a mold growth is obtained which for the purposes in view can be used as a simple koji.

Obviously, the details of procedure can be varied according to the skill of the operator without departing from the essentials of the invention, since the proportions, temperatures, and other like details heretofore specified, although efficient for the successful practice of the improvement are not to be regarded as exclusive. Thus for example, it is quite feasible to divide the starch-carrier when used, into two portions one of which would be united with the koji and water, and after lapse of three or four hours with consequent fermentation, the remaining portion supplied to form a finished dough. When the characteristic alcoholic flavor develops, the dough will be divided into cakes or "crumbs" to check the fermentation, as usual.

Having thus described the invention, what we claim as new, and desire to secure by Letters Patent, is—

1. The method of leaven making which consists in admixing koji and a starch carrier with water excess maintaining the mass at suitable temperature to cut the starch and promote fermentation, and, as the alcoholic flavor develops, checking the incipient fermentation throughout the dough to finish and preserve the leaven active, substantially as described.

2. The method of leaven making which consists in admixing koji, a starch carrier and a yeast starter with water excess maintaining the mass at suitable temperature to cut the starch and promote fermentation and as the alcoholic flavor develops checking the incipient fermentation throughout the dough to finish and preserve the leaven active, substantially as described.

3. The process of manufacturing a leaven ferment adapted for brewery or distillery use which consists in soaking koji with its steamed starch carrier in water excess, maintaining the mixture thus formed at proper temperature to both cut the starch and promote fermentation, and when the alcoholic flavor develops, holding the batch in its incipiently fermented state by cooling or otherwise, in readiness to apply the same to the converted wort or mash at the ferment vat, substantially as described.

4. The method of leaven making which consists in admixing koji with water excess and a separate cooked (preferably steamed) starch carrier, maintaining the mass at suitable temperature to cut the starch and promote fermentation and as the alcoholic flavor develops checking the incipient fermentation throughout the dough to finish and preserve the leaven active, substantially as described.

5. The method of making leaven which consists in separately soaking koji with excess of water and when proper fermentation ensues admixing the steamed starch carrier in bulk therewith, maintaining the mass at suitable temperature to cut the starch by the koji diastase and to promote fermentation and, as the alcoholic flavor develops, gradually arresting the incipient fermentation throughout the dough to finish and preserve the leaven active, substantially as described.

6. The method of making leaven which consists in admixing the selected converter and ferment herein described with a moist, steamed starch carrier addition, maintaining the comparatively dry mass at a suitable temperature to cut the starch and promote fermentation, and, as the alcoholic flavor develops, checking the incipient fermentation throughout the dough to preserve the activity of the leaven, substantially as described.

7. A finished leaven comprising koji and a starch carrier in incipient homogeneous fermented admixture comparatively dry (that is, in cake or dough form) and free from alcohol excess, substantially as described.

GEORGE D. HART.
CHARLES L. HART.

Witnesses:
JAMES H. PENCE,
FRED GERLACH.